April 23, 1957 K. T. MILLER 2,789,452
APPARATUS FOR DRESSING THE END OF COAXIAL CABLE
Filed Feb. 17, 1956 2 Sheets-Sheet 1

INVENTOR.
Kenneth T. Miller
BY Ross & Ross, Attys.

April 23, 1957  K. T. MILLER  2,789,452
APPARATUS FOR DRESSING THE END OF COAXIAL CABLE
Filed Feb. 17, 1956  2 Sheets-Sheet 2
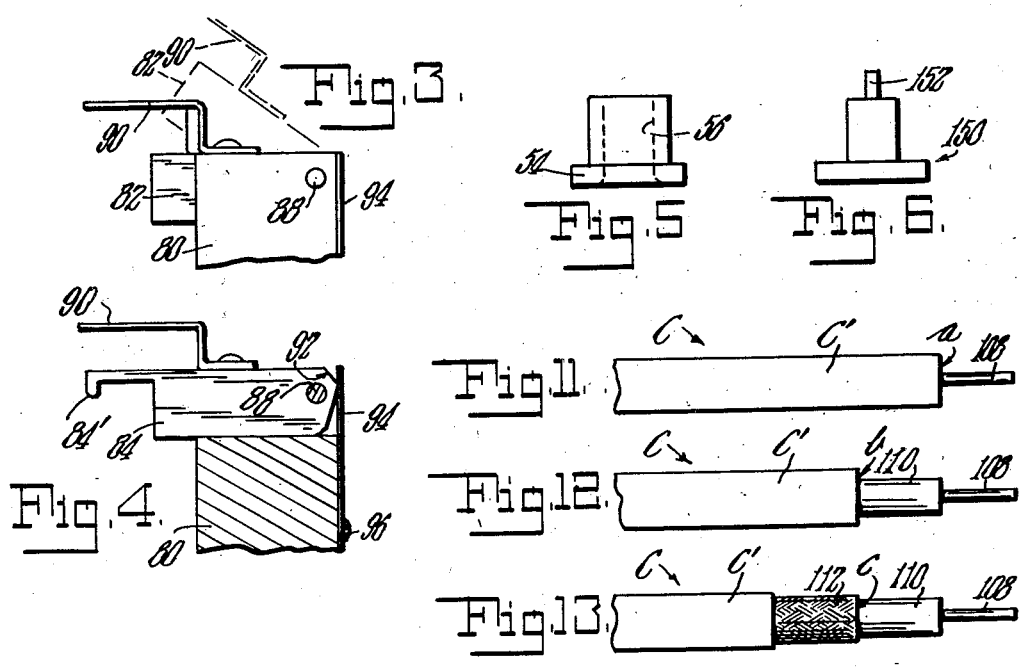
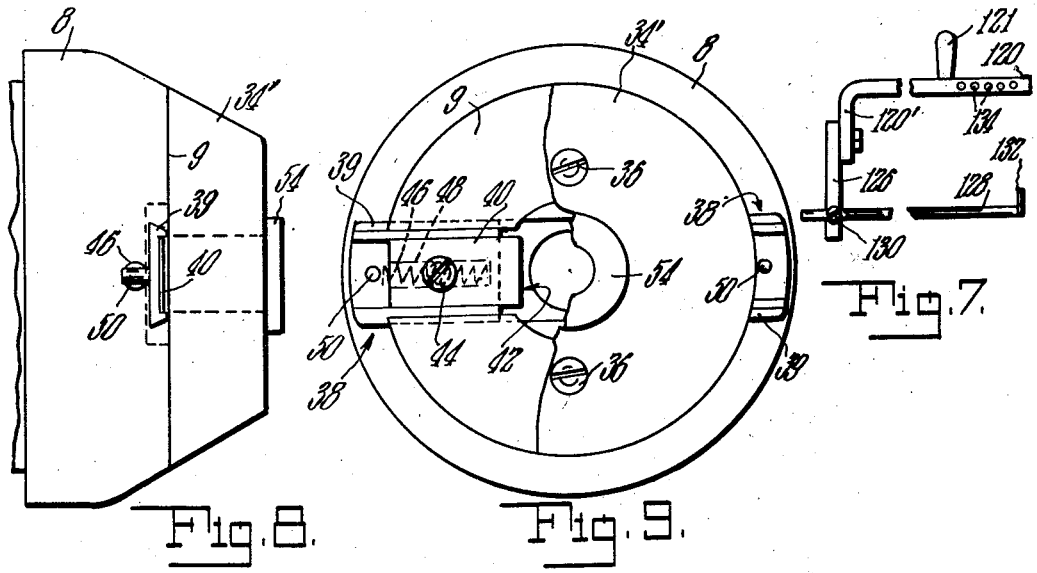
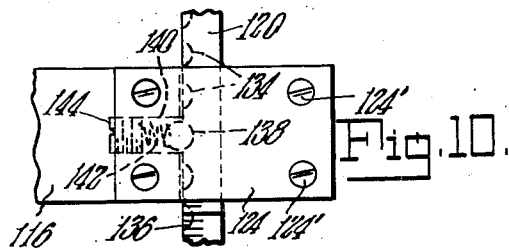
INVENTOR.
Kenneth T. Miller
BY

United States Patent Office 2,789,452
Patented Apr. 23, 1957

2,789,452

APPARATUS FOR DRESSING THE END OF COAXIAL CABLE

Kenneth T. Miller, Longmeadow, Mass.

Application February 17, 1956, Serial No. 566,174

6 Claims. (Cl. 81—9.51)

This invention relates to improvements in apparatus for dressing coaxial cable.

The principal objects of the invention are directed to the provision of apparatus for dressing the end of a coaxial cable to prepare it for securement in a fitting.

Coaxial cables usually include a central conductor surrounded by insulation, a woven conducting layer around the insulation and a sheath or covering around the conducting layer.

For securement in a fitting the end of the cable is prepared by stripping off the insulation, woven layer and covering from the inner conductor a certain distance, stripping the woven layer and covering back on the insulation a certain distance and finally stripping the covering from the woven layer for a certain distance. This leaves lengths of the center conductor, insulation and woven layer exposed.

According to the novel features of the invention apparatus is provided for performing the three stripping operations successively to thereby prepare the end of the cable for securement in a fitting.

With the foregoing and various other novel features and advantages and other objects of our invention as will become more readily apparent as the description proceeds, our invention consists in certain novel features of construction and in the combination and arrangement of parts as will be hereinafter more particularly pointed out in the claims hereunto annexed and more fully described and referred to in connection with the accompanying drawings wherein:

Fig. 3 is an elevational view on the line 3—3 of Fig. 1;

Fig. 4 is a sectional elevation view on the line 4—4 of Fig. 1;

Fig. 5 is an elevational view of a guide member for a cable;

Fig. 6 is an elevational view of a member for the apparatus;

Fig. 7 is a small scale side elevational view of the cable stop mechanism of the apparatus of the invention;

Fig. 8 is a side elevational view of the forward portion of the head of the apparatus shown in Figs. 1 and 2;

Fig. 9 is a front elevational view of the forward end of the head shown in Fig. 8;

Fig. 10 is a plan view of the holder for the cable stop member of the invention; and Figs. 11, 12 and 13, are plan views of an end portion of coaxial cable to explain the stripping operations performed by the apparatus.

Figures 1, 2:
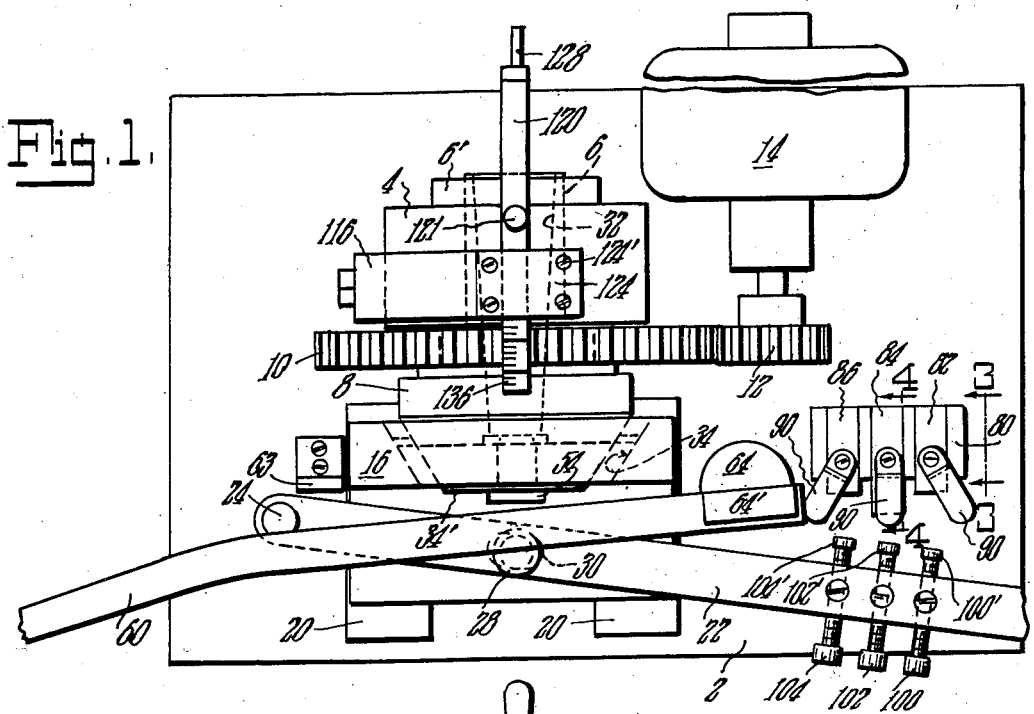
Figs. 1 and 2 are plan and front elevational views of apparatus embodying the novel features of the invention.

In the following description and claims, various details will be identified by specific means for convenience. These names, however, are intended to be as generic in their application as the art will permit.

Referring now to the drawing more in detail, in which similar characters of reference indicate corresponding parts in the several figures and referring more particularly to the preferred form of our invention, selected for illustrative purposes, the invention will now be described.

A base is represented by 2 and has a bearing 4 secured thereto, in suitable manner, and in which a rear end portion 6 of a head 8 is rotatable. A collar 6' is secured to the portion 6.

A gear 10 is fixed to the head in mesh with which is a gear 12 of a motor 14 by means of which the head 8 is rotated as the motor is energized.

The head is provided with cutter devices 38 as will be explained. These are movable radially inwardly of the head to cutting positions by an actuator 16. Said actuator has a lower elongated portion 18 slidable between guides 20 secured to the bed 2.

The actuator is movable from a position forwardly of the forward end of the head to rearward cutting position of the cutter devices. There are three cutting positions of the cutter devices, as will be described in connection with the form of the invention being disclosed.

An operating lever 22 for the actuator 16 is pivoted at 24 to a part 26 secured to the bed 2. A pivot 28 of the actuator 16 extends through a slot 30 of lever 22. As the lever is swung in one direction or the other the actuator is moved back and forth relative to the head 8.

The head is provided with an axial bore 32 tapering towards the forward end thereof and a forward cap 34' is secured to the forward end of said head by screws 36, or the like.

Cutter devices 38 rearwardly of the cap 34 have slides 39 which are slidable radially in the face 9 of the head. Said slides carry cutters 40 having inner cutting edges such as 42, shown in Fig. 9. The cutters 40 are secured in place by screws 44. Springs 46 in sockets, such as 48, of the head are disposed between bottoms of said sockets and abutments 50 depending from the slides and urge the slides outwardly of the head for contact of outer ends thereof with an inner conical bore 34 of the actuator.

As the actuator 16 is moved rearwardly relative to the head the slides 39 are moved inwardly towards one another by the conical surface 34 to bring the cutting edges 42 into engagement with a cable end in the bore of the head.

A guide bushing such as 54, shown in Fig. 5, is provided for the forward end or cap of the head, said bushing is provided with an axial bore 56 to receive the end portion of a cable to be inserted in the bore of the head. There will be a plurality of guides such as 54 having bores of different diameters for cables of different diameters.

A pair of elongated members 60 are pivoted at 62 to a support 64. Said support has a lower stem 66 rotatable in a member 68 secured to the bed 2. A screw 70 of the member 68 has an inner end seated in an annular groove 72 of the stem 66 to prevent separation of the members 64 and 68 and permit rotation of member 64.

The members 60 are provided with hardened jaws 74 secured therein and these have roughened seats 76. The end portion of a cable extending into the bore of the head is gripped in the seats 74 by squeezing members 60 together and is thereby held during rotation of said head.

A spring 61 has opposite ends seated in sockets of adjacent sides of the members 60, as shown in Fig. 2. Said spring then urges the members to open position. Blocks 64' fixed to the member 64 are engaged by the pivoted ends of members 60 to limit opening movements of said members. Not only are the members 60 swingable in a vertical plane, but they may be swung towards and away from the forward end of the cap.

The operating lever as it is swung counterclockwise moves the actuator 16 inwardly. The actuator in turn moves the cutting devices inwardly so that the inner cutting edges thereof act on the cable extending through the cable guide into the bore of the head.

Stop mechanism for the operating lever will now be explained. A block 80 is secured to the base 2 and has three stops 82, 84 and 86 disposed in suitable grooves provided therefor. The stops are pivoted at 88 in the block 80 for swinging from the horizontal position shown and in a clockwise direction to an upper non-operative position indicated in Fig. 3. Said stops are provided with finger engaging members 90 by means of which they may be swung upwardly or returned to the horizontal stop position.

Each stop has an upper rear face 92, see Fig. 4, engageable with the upper portion of a flat spring 94 secured by screws such as 96 to the lower portion of the block 80. The parts are arranged so that the spring acts on the stops to releasably hold them in upper, inoperative or non-stop positions.

Adjustable screw threaded members 100, 102 and 104 are in threaded engagement with the operating lever 22 and have inner heads 100′, 102′ and 104′ for abutting inner ends of the stops 82, 84, 86 when the stops are in operative stop positions thereby to limit counterclockwise movement of lever 22 and resulting inward movement of the actuator 16.

The end portion of a cable C is shown in Figs. 11, 12 and 13. The outer cover C′, braided outer conductor or sheath, and the insulation are first removed so that the inner conductor 108 is exposed as in Fig. 11. Next as in Fig. 12 the outer cover and braided conductor are removed to expose the insulation 110. Finally, as in Fig. 13, the outer cover is removed to expose the braided conductor 112. The cuts are made at a, b, and c.

The relative lengths of the exposed conductor 108, insulation 110 and braided conductor 112 may be as required, and is controlled by the inward movements of lever 22.

The cable end is inserted in the guide at the forward end of the bore of the head and against an adjustable stop in such a manner as to provide the desired length of exposed conductor, insulation and braided conductor. That is the stop is adjustable along the bore of the head to locate the cable relative to the cutters for each of the several cuts in order to obtain the exposed lengths desired.

The stop for the cable includes a bracket 116 secured to a side of the bearing 4 which has an upper end portion 118. A bar 120 is slidable in a suitable groove provided in the end portion 118 and a cap 124 is secured to the upper side of said portion 118 by screws 124′, see Figs. 1 and 10.

A depending portion 120′ of the bar 120 has fixed thereto an elongated member 126. A rod 128 is slidable in the member 126 and is held in adjusted positions by a set screw 130. A plate member 132 is fixed on the forward end of rod 128, see Fig. 7.

The bar 120 has a manually engageable member 121 fixed thereto and is provided with longitudinally spaced sockets 134 in a side thereof and with indicia 136 on an adjacent upper side thereof, see Fig. 10. A detent in the form of a ball 138 in a bore 140 of the bracket portion 118 is urged inwardly by a spring 142 disposed rearwardly of a screw 144.

The rod 128 extends forwardly in the bore of the head and the stop is so adjusted that the plate 132 of rod 128 in the bore of the head is engaged by the end of the cable in said bore in such fashion that the first cut a will provide the desired length of exposed conductor 106. For the second cut b the bar 120 is moved rearwardly to move plate 132 rearwardly through a distance for the desired length of exposed insulation. The adjustment may be made by means of the indicia on bar 120. Likewise for the third cut c the bar is moved rearwardly to locate the plate to operate as a stop for the end of the conductor 108 to provide the desired length of exposed braided conductor. In other words the stop is adjusted in such a manner as to provide the desired lengths or distances between cuts.

To provide the desired depths of cuts or the desired distances between the cutting edges of the cutting devices the movement of lever 22 and thereby the actuator is limited by the stop means previously described. The adjustment of the stop means is accomplished by means of gauges.

With a bushing guide such as 54 in the forward end of the bore of the head and said bushing having a bore for a certain cable a gauge such as 150 of Fig. 6 is inserted in the bore of the guide.

Said gauge has a gauge plug 152 which is the size of the innerconductor 108 of the certain cable. The lever 22 is swung counterclockwise to move the actuator rearwardly. The cutting devices are moved inwardly by the actuator to bring the cutting edges against the plug 152. With the lever held in this position the threaded member 100 is adjusted so that the head 100′ thereof abuts the end of stop 82 in its operative stop position. Thus the lever is stopped against further rearward movement and the cutters as they are rotated by the head will cut through cover of the cable, braided conductor, and insulation down to the inner conductor.

After the stop screw 100 for the first cut has been adjusted the stop 82 is swung upwardly and stop 84 is swung downwardly.

A gauge like 150 but having a plug part, such as 152 of a diameter corresponding to that of the cable insulation is inserted in the cable guide. As before the lever 22 is operated to cause the actuator to move the cutting edges of the cutters against plug part of such a gauge. Screw 102 is then adjusted so that the head 102′ abuts the end of stop 84.

The stop 84 is provided with an outer lip 84′, see Fig. 4 for a purpose to be described.

Subsequent to the adjustment of screw 102, the stop 84 is moved to upper inoperative position and stop 86 is placed in stop position. A gauge similar to gauge 150 is placed in the guide of the head bore which will have a plug portion equal in diameter to that of the braided conductor of the cable. The stop 104 is adjusted so that the head 104′ thereof abuts stop 84.

Thus the screws 100, 102 and 104 are adjusted relative to their respective stops to limit operative swinging of lever 22 for each of these cuts a, b and c. That is for each of the cuts the cutting edges of the cutting devices will be spaced the proper distance apart.

In operation with the stops 82, 84 and 86 in non-stopping positions the bar 120 is adjusted to locate the stop plate 132 in the bore 32 at a distance inwardly of the cutters 50 to provide cut a the desired distance inwardly of the end of the cable.

The end portion of the cable is inserted through the cable guide into the bore of the head against the plate 132. The members 660 are squeezed to grip and hold the cable and stop 82 is swung downwardly to stop position.

Lever 22 is swung counterclockwise to move the actuator and when head 101′ of screw 100 abuts stop 84 inward movement of the actuator is arrested and the cutters being rotated by the head will have made cut a. Stop 82 is moved to inoperative position.

For cut b the bar 120 is moved rearwardly to locate the cut b from cut a the desired distance and stop 84 is swung downwardly to stop position. The cable is advanced into the bore of the head against plate 132 and lever 22 is swung counterclockwise until head 102′ of screw 102 abuts stop 84 which completes cut b.

In cut b the braided conductor 112 is cut through as well as the cover C′ and to avoid fraying of the end of the conductor by the cutters they are opened up or moved apart by short movement of the actuator. This is accomplished by swinging operating lever 22 clockwise when the head 102′ of screw 102 brings up against the lip 84′ of stop 84 previously described. Stop 84 is then swung upwardly to inoperative position.

For cut c the bar 120 is adjusted to advance stop plate 132 in the head bore and stop 86 is swung downwardly to stop position. Lever 22 is swung counterclockwise for abutment of screw head 104′ with the stop 86 to complete cut b.

For each cutting operation the cable is gripped and held by the members 60 which are released for longitudinal movements of the cable. Following each cutting operation the cable may be retracted for removal of the severed material.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description and all modifications and variations as fall within the meaning and purview and range of equivalency of the appended claims are therefore intended to be embraced therein.

What it is desired to claim and secure by Letters Patent of the United States is:

1. Apparatus for dressing the end of coaxial cable comprising in combination, a support and a head rotatable thereon having an axial bore from the rear to forward ends thereof disposed on the axis of rotation of said head, said bore having a cable guide at the forward end thereof, cutting devices slidable radially of said head having adjacent inner cutting edges and outer ends extending outwardly of said head, an actuator slidable on said support relative to said head between a forward position and positions rearwardly thereof, said actuator having a conical surface for engaging outer ends of the cutting devices adapted in movements from forward position to move said cutting devices inwardly to locate said cutting edges in various cutting positions, movable operating means to move said actuator, and a plurality of independently operable selective stop means to limit movement of said operating means from forward position to thereby operate said actuating means and position the cutting edges of the cutting devices according to the stop means selected, and manually engageable means for engaging and holding the end portion of a cable in said guide.

2. Apparatus set forth in claim 1 wherein said manually engageable means includes a member swingably mounted on said base and a pair of cable gripping levers pivoted to said member for relative swinging movements.

3. Apparatus set forth in claim 1 wherein said manually engageable means includes a member swingable on said base on an axis disposed at right angles relative to the axis of rotation of said head and a pair of elongated levers pivoted at corresponding ends to said member on axes parallel to the axis of rotation of said head and provided intermediate their ends and on adjacent sides with cable holding recesses.

4. Apparatus set forth in claim 1 wherein said stop means includes a plurality of stop members independently mounted for swinging relative to said support between stop and non-stop positions and in planes at right angles to the plane of movement of said operating means and stop screws adjustable in said operating means adapted to engage said stop members in stop positions thereof.

5. Apparatus for dressing the end of coaxial cable comprising in combination, a support and a head rotatable thereon on a horizontal axis having an axial bore from rear to forward ends thereof disposed on the axis of rotation of said head, said bore having a cable guide in the forward end thereof for guiding a cable end in said bore, cutting devices slidable radially of said head having adjacent inner cutting edges and outer ends extending outwardly of said head, an actuator slidable on said support relative to said head between a forward position and positions rearwardly thereof, said actuator having a conical surface for engaging outer ends of the cutting devices adapted in movements from forward position to move said cutting devices inwardly to locate said cutting edges in various cutting positions, movable operating means to move said actuator, and a plurality of independently operable selective stop means to limit movement of said operating means from forward position to thereby operate said actuating means and position the cutting edges of the cutting devices according to the stop means selected, manually engageable means for engaging and holding the end portion of a cable in said guide, and adjustable stop means for the end of a cable in said cable guide and base of the head.

6. Apparatus set forth in claim 5 wherein said stop means for the end of a cable includes; a bracket fixed to said support, an elongated bar having a forward end portion slidable in said bracket in parallelism with the axis of rotation of the head, releasable engageable means carried by the forward end of said rod and bracket to releasably hold said rod in positions of longitudinal adjustment, an elongated rod having a forward portion in the bore of the head provided on its forward extremity with a cable stop, and rigid connections between the rear ends of said bar and rod whereby said rod is supported in said bore by said rod.

References Cited in the file of this patent

UNITED STATES PATENTS 2,645,959    Fuchs et al. _____ July 21, 1953